(12) United States Patent
Hsu

(10) Patent No.: US 7,682,727 B2
(45) Date of Patent: Mar. 23, 2010

(54) PORTABLE ELECTRONIC DEVICE HAVING A LATCHED BATTERY COVER

(75) Inventor: Cheng-Hua Hsu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 1197 days.

(21) Appl. No.: 11/163,255

(22) Filed: Oct. 12, 2005

(65) Prior Publication Data

US 2007/0031727 A1  Feb. 8, 2007

(30) Foreign Application Priority Data

Aug. 3, 2005  (TW) .............................. 94126374 A

(51) Int. Cl.
*H01M 2/10* (2006.01)
*E05C 1/02* (2006.01)
*E05C 1/08* (2006.01)
(52) U.S. Cl. .................... 429/97; 292/137; 292/163
(58) Field of Classification Search ................... 429/97; 292/163

See application file for complete search history.

(56) References Cited

U.S. PATENT DOCUMENTS

2004/0001997 A1 *  1/2004  Zatezalo et al. ............... 429/96
2005/0042501 A1 *  2/2005  Hou ........................... 429/97

FOREIGN PATENT DOCUMENTS

CN  2515765 Y  10/2002
CN  2689464 Y  3/2005

* cited by examiner

*Primary Examiner*—Patrick Ryan
*Assistant Examiner*—Ashley Kwon
(74) *Attorney, Agent, or Firm*—Kile Goekjian Reed & McManus PLL

(57) ABSTRACT

A portable electronic device includes a battery for providing electricity to the portable electronic device; a housing for accommodating the battery; a battery cover for covering the battery; a latch affixed to the housing in a slidable manner along a first direction, wherein when the latch is at a first position, the latch is capable of fixing the battery cover and the housing together; and an elastic unit for lifting the battery cover when the latch is at a second position.

14 Claims, 7 Drawing Sheets

PORTABLE ELECTRONIC DEVICE HAVING A LATCHED BATTERY COVER

BACKGROUND OF THE INVENTION

1. Field of the Invention

The present invention relates to a portable electronic device, and more particularly, to a portable electronic device having a latched battery cover.

2. Description of the Prior Art

As the related technology keeps improving, portable electronic devices such as mobile phones, personal digital assistants (PDA), and MP3 players are getting smaller and lighter. For increasing portability of portable electronic devices, most portable electronic devices comprise rechargeable batteries, such that when a battery is out of power, a user can replace or recharge the battery to keep the portable electronic device working.

However, different portable electronic devices have different designs, and thus the method of detaching the battery cover may not be the same. Therefore, when the user tries to replace the battery of a portable electronic device, the battery cover could be damaged (e.g. a catch hook of the battery cover could be damaged) due to the user being unfamiliar with the proper way to detach the battery cover. Such damage may cause the battery cover to no longer work, thus bringing inconvenience to the user and the manufacturer.

SUMMARY OF THE INVENTION

It is therefore an objective of the claimed invention to provide a portable electronic device having a battery cover that can be lifted by way of a latch in order to solve the problems of the prior art.

The present invention provides a portable electronic device comprising a battery for providing electricity to the portable electronic device; a housing for accommodating the battery; a battery cover for covering the battery; a latch affixed to the housing in a slidable manner along a first direction, wherein when the latch is at a first position, the latch is capable of fixing the battery cover and the housing together; and an elastic unit for lifting the battery cover when the latch is at a second position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
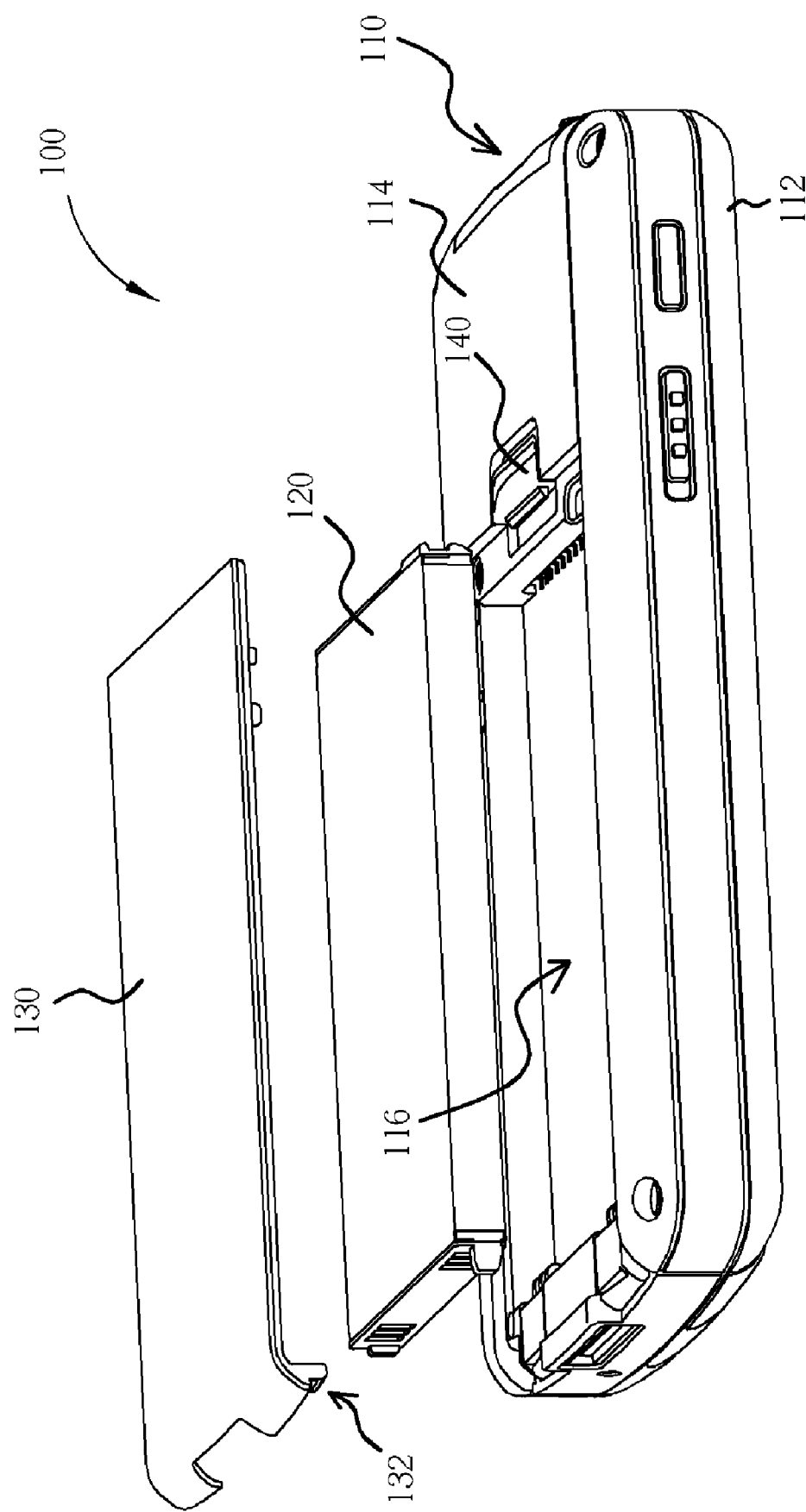
FIG. 1 is a diagram showing a portable electronic device of the present invention.
Figure 2:
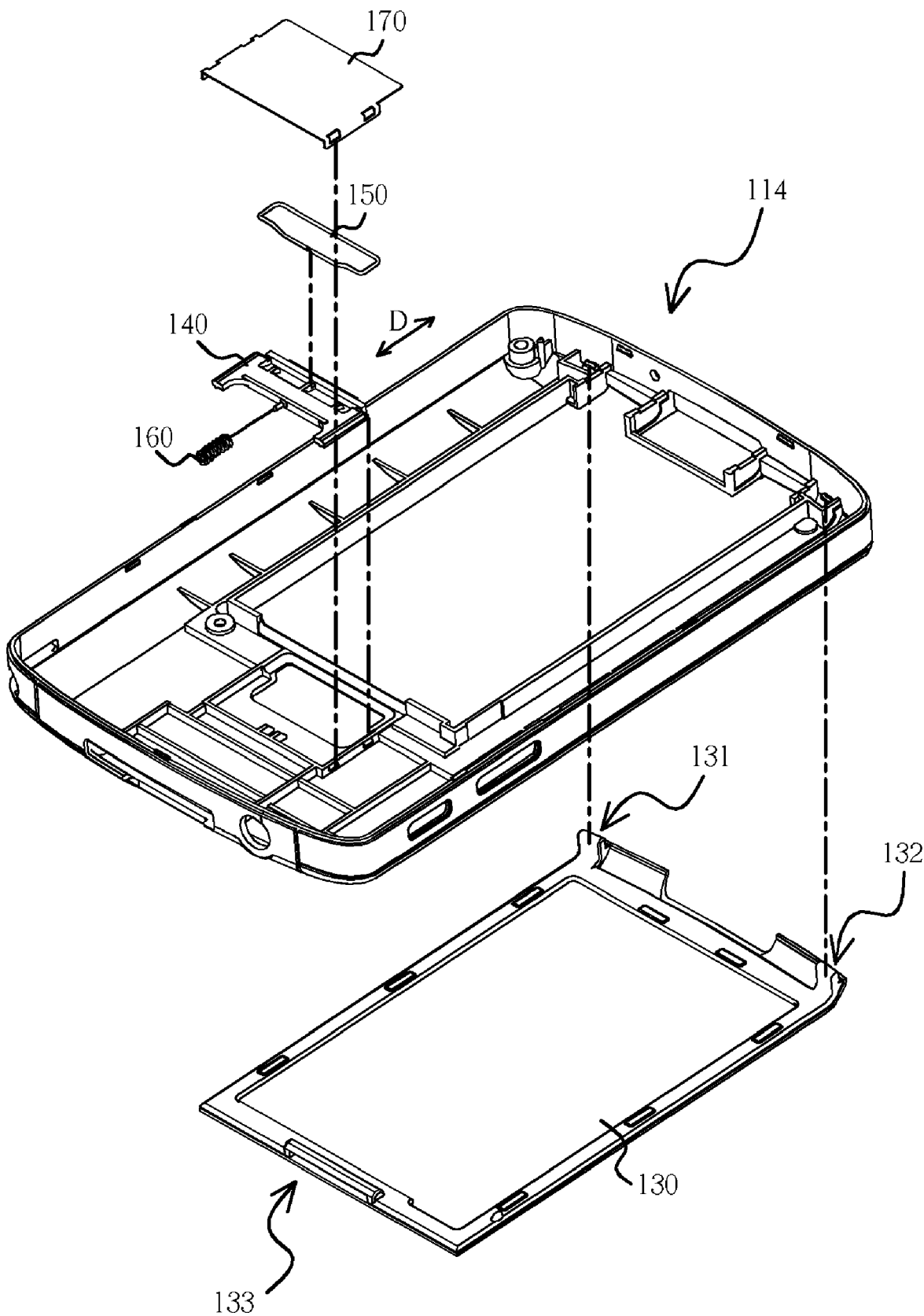
FIG. 2 is an exploded view of a back structure of the portable electronic device of FIG. 1.

Please refer to FIG. 1 and FIG. 2. FIG. 1 is a diagram showing a portable electronic device 100 of the present invention, and FIG. 2 is an exploded view of a back structure of the portable electronic device 100. As shown in FIG. 1, a case 110 of the portable electronic device 100 comprises an upper housing 112 and a lower housing 114 for accommodating a printed circuit board and related electronic components of the portable electronic device 100. A battery 120 can be placed in a battery compartment 116 of the case 110 to provide electricity to the portable electronic device 100. A battery cover 130 is for covering the battery 120, and the battery cover 130 comprises a plurality of catch hooks 131, 132, 133. When the battery cover 130 is attached on the case 110, the catch hooks 131, 132 are coupled with the lower housing and the catch hook 133 is coupled with a latch 140, such that the battery cover 130 is fixed onto the case 110. As shown in FIG. 2, the portable electronic device 100 further comprises an elastic unit 150 (such as a metal ring or a plastic ring) connected to the latch 140, a spring 160 for pushing the latch 140, and a latch cap 170 for constraining the latch 140 in directions perpendicular to a first direction (arrow D) in order to make the latch moveable along the first direction.

Figure 3:
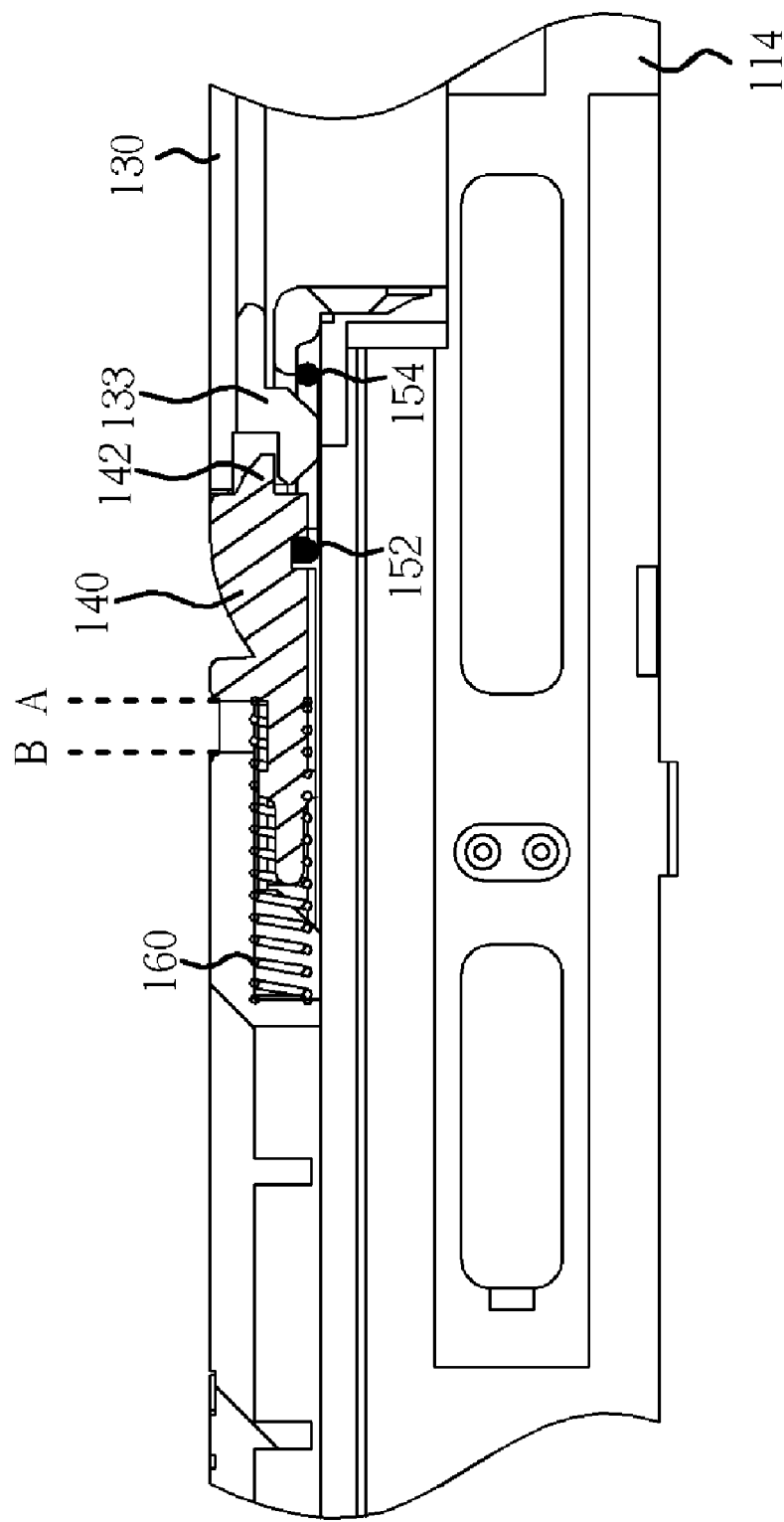
FIG. 3 is a diagram showing the latch fixing the battery cover on the lower housing when in a first position.
Figure 4:
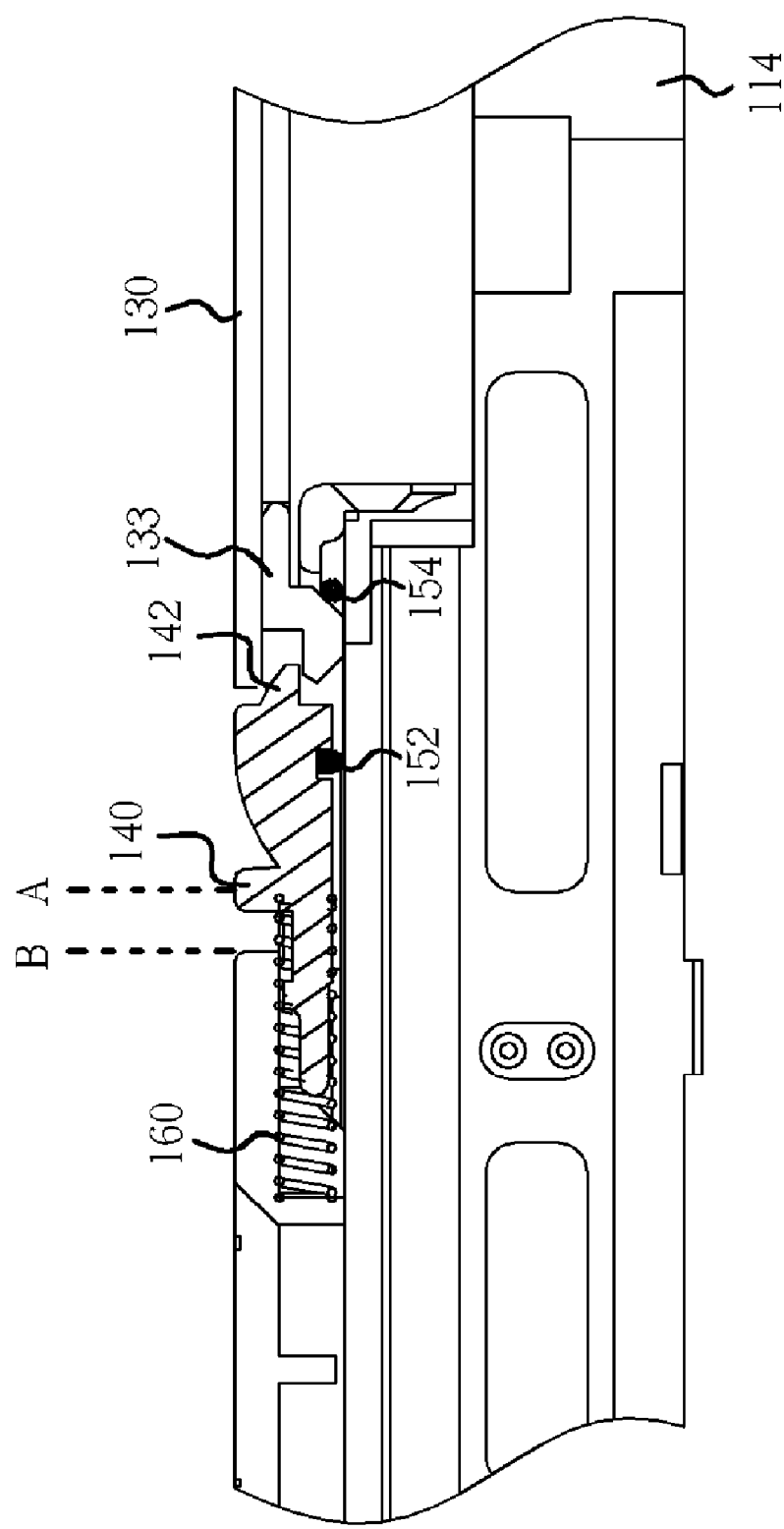
FIG. 4 is a diagram showing the latch leaving the first position.
Figure 5:
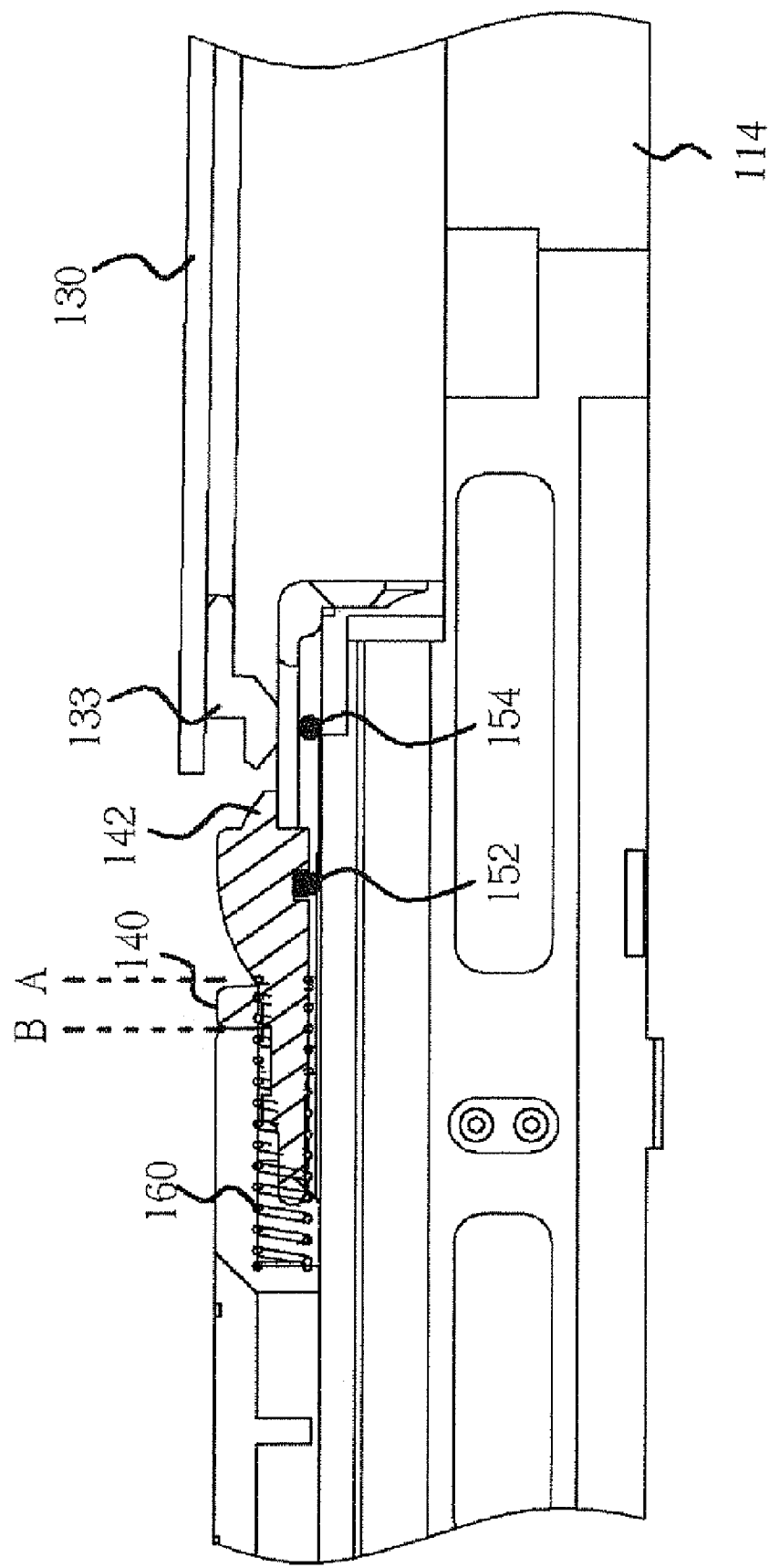
FIG. 5 is a diagram showing the elastic unit lifting the battery cover when the latch is in a second position.
Figure 6:
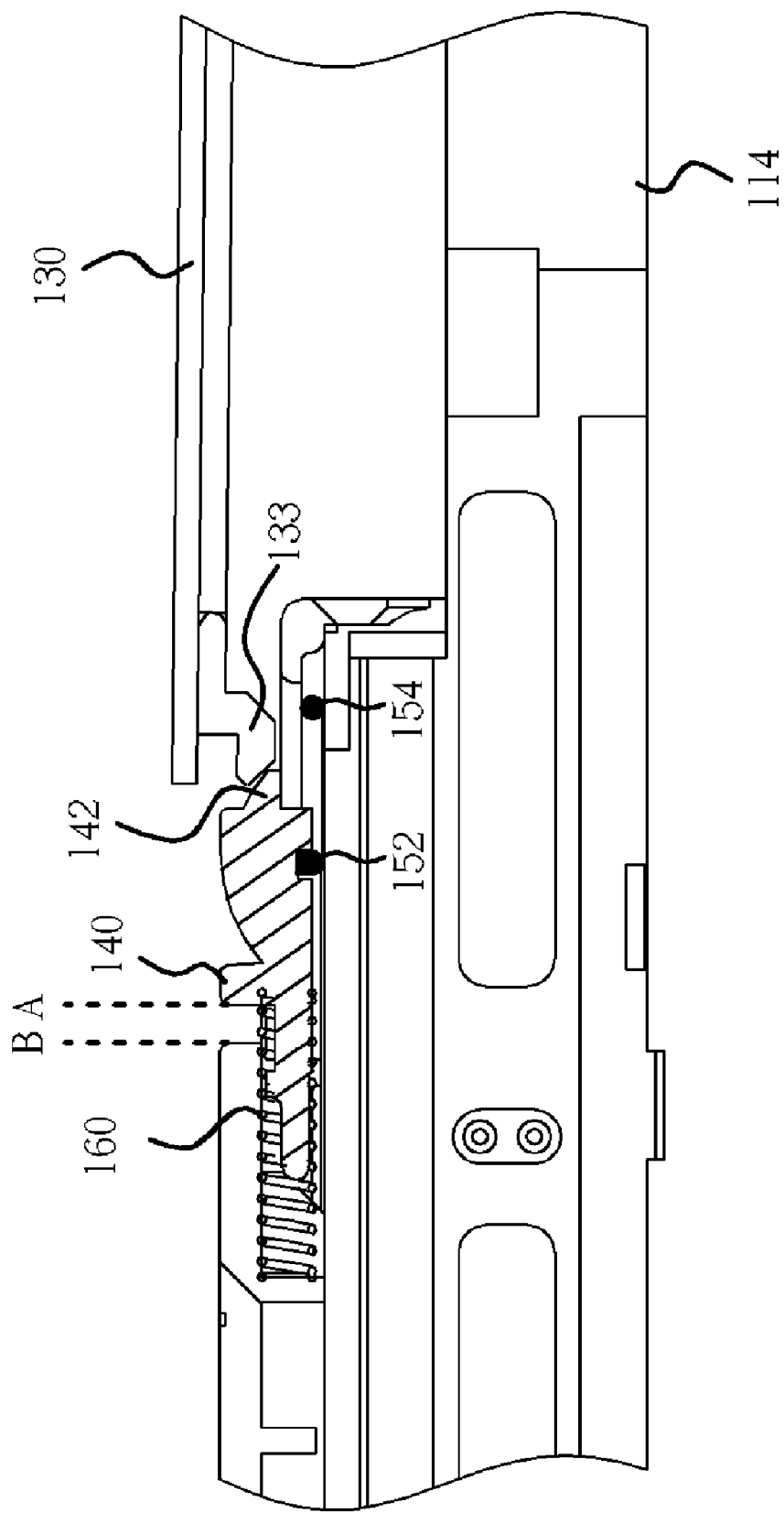
FIG. 6 is a diagram showing the spring pushing the latch back to the first position.
Figure 7:
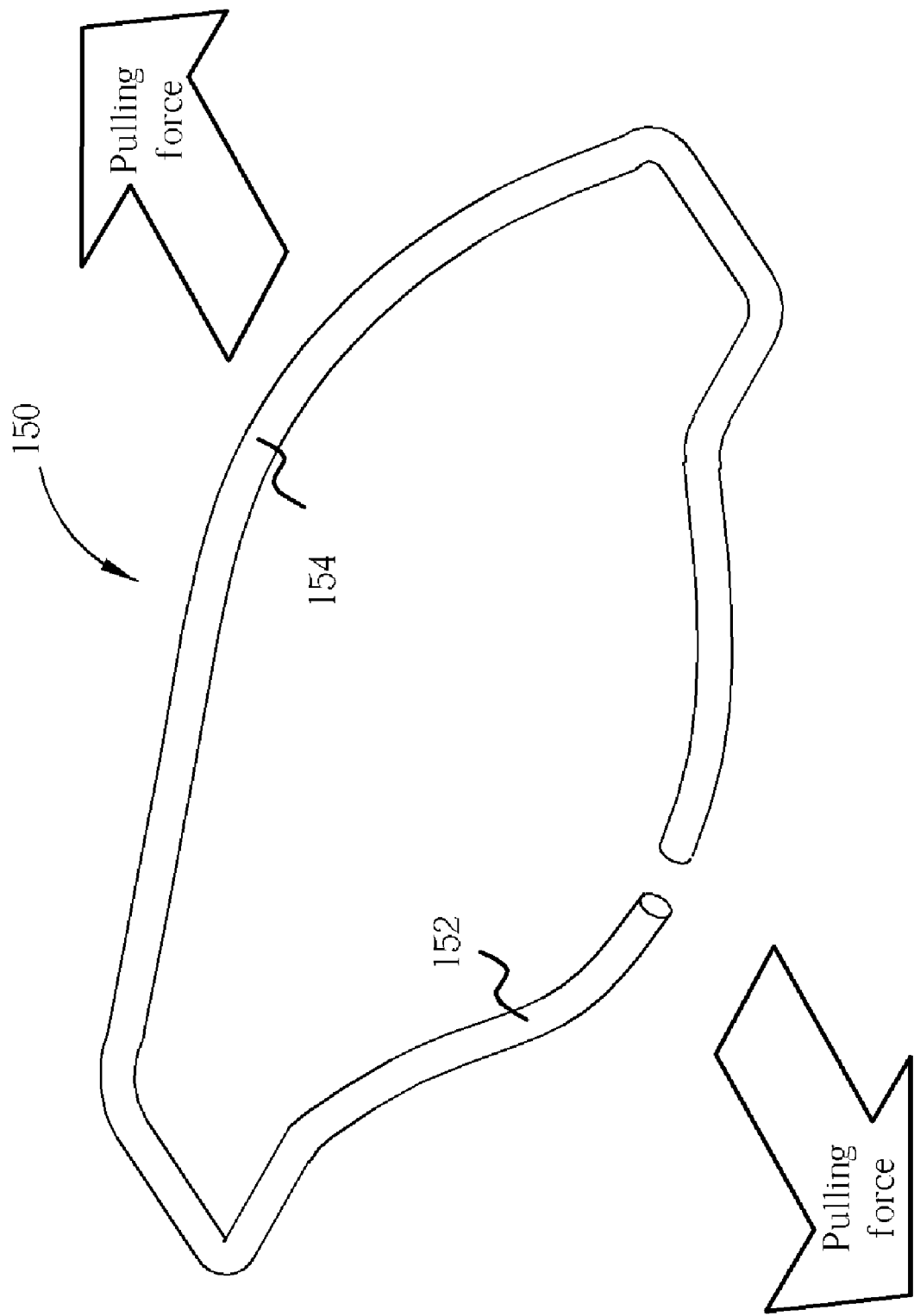
FIG. 7 is a diagram showing the elastic unit pulled to be deformed due to the latch leaving the first position.

Please refer to FIG. 3 to FIG. 6, and refer to FIG. 1 and FIG. 2 as well. FIG. 3 is a diagram showing the latch 140 fixing the battery cover 130 on the lower housing 114 while in a first position A. FIG. 4 is a diagram showing the latch leaving the first position A. FIG. 5 is a diagram showing the elastic unit 150 lifting the battery cover 130 while the latch 140 is in a second position 13, and FIG. 6 is a diagram showing the spring 160 pushing the latch 140 back to the first position A. As shown in the figures, when the latch 140 is in the first position A, a protrusion 142 of the latch 140 is coupled with the catch hook 133 of the battery cover 130. The catch hooks 131, 132 are coupled with the lower housing 114, such that the battery cover 130 is fixed on the lower housing 114. The catch hook 133 has a downwardly tapering lower end portion such that when the latch 140 is in the first position A, the downwardly tapering lower end portion of the catch hook 133 is disposed in the elastic unit 150, which has a first end 152 connected to the latch 140 and a second end 154 disposed under the batter cover 130 when the latch 140 is in the first position. When the latch 140 leaves the first position A a little bit, the protrusion 142 of the latch 140 is still coupled with the catch hook 133 of the battery cover 130. Therefore, the battery cover 130 remains to be fixed on the lower housing 114. However, because the first end 152 of the elastic unit 150 is connected to the latch 140 and the second end 154 of the elastic unit 150 is blocked by the catch hook 133 of the battery cover 130, the elastic unit 150 is pulled to be deformed while the latch 140 leaves the first position A. Please refer to FIG. 7, in which the elastic unit 150 is shown being pulled to deform by the latch 140 leaving the first position A. Thus, the second end 154 of the elastic unit 150 applies a force to surface of the downwardly tapering lower end portion of the catch hook 133 of the battery cover 130 when the latch 140 leaves the first position A. As the latch 140 moves to the second position B, the protrusion 142 of the latch 140 is no longer coupled with the catch hook 133 of the battery cover 130, and the force a lied to the surface of the downwardly tapering lower end portion of the catch hook 133 from the second end 154 of the elastic unit 150 will produce a force to lifts up the battery cover 130. Thereafter, if the latch 140 is released, the spring 160 pushes the latch 140 back to the first position A to keep the battery cover 130 lifted. Therefore, a user only needs to pick up one end of the battery cover 130, the end which is close to the latch 140, for detaching the battery cover 130.

In the above embodiment, the elastic unit 150 has a ring shape, however, the elastic unit 150 can also have another shape. In addition, besides utilizing the elastic unit 150 to lift the battery cover 130, the present invention can also utilize the elastic unit 150 to lift a cover of other device, as long as a cover is lifted by an elastic unit when a latch is moved.

Summarizing the above, the present invention provides a portable electronic device having a battery cover that is lifted by moving a latch. Therefore, the user can easily detach the battery cover 130 by pushing the latch 140 to lift up the battery cover 130.

In contrast to the prior art, the user can easily understand the way of detaching the battery cover 130 of the portable electronic device 100 of the present invention. That is, the battery cover 130 can be easily detached without damaging the catch hook of the battery cover. Therefore, the battery cover 130 and related mechanism are less likely to be damaged by a user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
   a battery for providing electricity to the portable electronic device;
   a housing for accommodating the battery;
   a battery cover for covering the battery with a plurality of catch hooks formed thereon
   a latch affixed to the housing in a slidable manner along a first direction, wherein when the latch is at a first position, the latch is engaged with at least one of the plurality of catch hooks to fix the battery cover and the housing together; and
   an elastic unit having a first end connected to the latch and a second end disposed under the battery cover when the latch in at the first position for lifting the battery cover when the latch is at a second position;
   wherein the at least one of the plurality of catch hooks has a downwardly tapering lower end portion, which is disposed in the elastic unit when the latch is at the first position, and when the latch moves from the first position to the second position, the first end of the elastic unit is driven by the latch and produces a force pulling back the second end of the elastic unit, and the second end of the elastic unit is blocked by the downwardly tapering lower end portion of at least one of the plurality of catch hooks and a force is thus produced and applied to the surface of the downwardly tapering end portion, and thus when the latch is at the second position, the battery cover is lifted up and released from the housing.

2. The portable electronic device of claim 1 further comprising a spring for pushing the latch to the first position.

3. The portable electronic device of claim 1 wherein the elastic unit is a metal elastic unit.

4. The portable electronic device of claim 1 wherein the elastic unit is a plastic elastic unit.

5. The portable electronic device of claim 1 wherein the elastic unit is of a ring shape.

6. The portable electronic device of claim 1 wherein the elastic unit is deformed when the latch leaves the first position.

7. The portable electronic device of claim 1 further comprising a latch cap fixed on the housing, the latch cap for constraining the latch in a direction perpendicular to the first direction.

8. A mechanism for lifting a cover when a latch is moved, comprising:
   a housing;
   a cover with a plurality of catch hooks for covering the housing;
   a latch affixed to the housing in a slidable manner along a first direction, wherein when the latch is at a first position, the latch is engaged with at least one of the plurality of catch hooks to fix the cover and the housing together; and
   an elastic unit having a first end connected to the latch and a second end disposed under the cover when the latch is at the first position for lifting the cover when the latch is at a second position;
   Wherein the at least one of the plurality of catch hooks has a downwardly tapering lower end portion, which is disposed in the elastic unit when the latch is at the first position, and when the latch moves from the first position to the second position, the first end of the elastic unit is driven by the latch and produces a force pulling back the second end of the elastic unit and the second end of the elastic unit is blocked by the downwardly tapering lower end portion of at least one of the plurality of catch hooks and a force is thus produced and applied to the surface of the downwardly tapering end portion and thus when the latch is at the second position the cover is lifted up and released from the housing.

9. The mechanism of claim 8 further comprising a spring for pushing the latch to the first position.

10. The mechanism of claim 8 wherein the elastic unit is a metal elastic unit.

11. The mechanism of claim 8 wherein the elastic unit is a plastic elastic unit.

12. The mechanism of claim 8 wherein the elastic unit is of a ring shape.

13. The mechanism of claim 8 wherein the elastic unit is deformed when the latch leaves the first position.

14. The mechanism of claim 8 further comprising a latch cap fixed on the housing, the latch cap for constraining the latch in a direction perpendicular to the first direction.

* * * * *